United States Patent
Kwon

(10) Patent No.: US 7,017,361 B2
(45) Date of Patent: Mar. 28, 2006

(54) COOLING SYSTEM FOR BATTERIES IN ELECTRIC VEHICLE

(75) Inventor: Young-Hae Kwon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 744 days.

(21) Appl. No.: 10/261,181

(22) Filed: Sep. 30, 2002

(65) Prior Publication Data

US 2003/0082438 A1   May 1, 2003

(30) Foreign Application Priority Data

Oct. 29, 2001   (KR) .......................... 2001-0066722

(51) Int. Cl.
*F25D 23/12*   (2006.01)
(52) U.S. Cl. .................... 62/259.2; 62/239; 62/244
(58) Field of Classification Search ............... 62/259.2, 62/239, 243, 244; 429/120, 148
See application file for complete search history.

(56) References Cited

U.S. PATENT DOCUMENTS 6,931,884 B1 *   8/2005   Kolda et al. .................. 62/449

* cited by examiner

*Primary Examiner*—Melvin Jones
(74) *Attorney, Agent, or Firm*—Morgan Lewis & Bockius LLP

(57) ABSTRACT

The present invention relates to a cooling system for batteries in an electric vehicle. The cooling system includes an air conditioner for generating cool air; a battery tray in which batteries are mounted, the battery tray having an air intake passageway to receive cool air supplied by the air conditioner to cool the batteries, and having an air exhaust passageway. An air duct interconnects the air conditioner and the air intake passageway of the battery tray. A mesh assembly including a plurality of holes is mounted within the air duct, and first condensation drain holes are formed along a lower end of the mesh assembly. A cooling fan is provided in the air exhaust passageway of the battery tray to draw the air inside the battery tray outside the system.

8 Claims, 2 Drawing Sheets

COOLING SYSTEM FOR BATTERIES IN ELECTRIC VEHICLE

FIELD OF THE INVENTION

The present invention relates to a cooling system for batteries in an electric vehicle, and more particularly, to a cooling system for batteries in an electric vehicle in which the cooling system includes a condensation drain unit for an air conditioner used in the cooling system.

BACKGROUND OF THE INVENTION

In an electric vehicle, a number of batteries are typically grouped together and mounted in a battery tray. The tray is covered with a protective housing and this entire assembly containing the batteries is provided outside the passenger compartment on the floor of vehicle. A plurality of holes for allowing air to enter the battery tray are formed at specific locations of the same.

The batteries used in an electric vehicle must be recharged after the vehicle has been driven a certain distance, which varies from vehicle to vehicle. Recharging is performed using normal charging or quick charging. Heat develops by the chemical reactions taking place inside the batteries during charging, and ideally, the temperature of the batteries is maintained in the range of 25~30° C. However, when actually performing normal or quick charging, the temperature of the batteries far exceeds this desirable level. Further, the ideal temperature of 25~30° C. is not possible to maintain when the outside temperature itself surpasses this range of temperatures. This is the case even when a cooling fan is used to expel the air from within the battery tray during recharging. Overheating is therefore a problem when recharging the batteries for an electric vehicle.

The problem of overheating reduces battery performance and battery life. If the batteries are severely overheated, the batteries may deform so that a short develops internally. This may result in vaporized battery gas combusting or exploding, thereby potentially causing the vehicle to catch fire.

To remedy this problem, cooling systems using an air conditioner have been employed. However, while providing sufficient cooling, such systems have a drawback in that condensation in the battery tray as a result of the air conditioner can cause corrosion in the batteries and wiring. Also, the presence of condensation water can degrade the overall performance or cause short circuits.

To address the condensation problem, one or more drain holes may be placed in the bottom of the battery tray. However, due to the forced air flow of cooling air through the battery tray, a negative pressure can be formed that prevents complete draining of the condensation water. Thus, condensation water can accumulate in the battery tray in spite of the drain holes.

SUMMARY OF THE INVENTION

The present invention provides a cooling system for batteries in an electric vehicle, in which a mesh assembly and condensation drain holes are provided in an air duct such that condensation within a battery tray is effectively reduced.

In one preferred embodiment, an air conditioner is provided to generate cool air to be delivered to a battery tray in which batteries are mounted. The battery tray thus has an air intake passageway to receive the cool air supplied by the air conditioner. The battery tray also has an air exhaust passageway with a cooling fan disposed therein to draw air inside the battery tray to outside the system. An air duct interconnects the air conditioner and the air intake passageway of the battery tray. A mesh assembly including a plurality of holes is mounted within the air duct, and first condensation drain holes are formed along a lower end of the mesh assembly.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
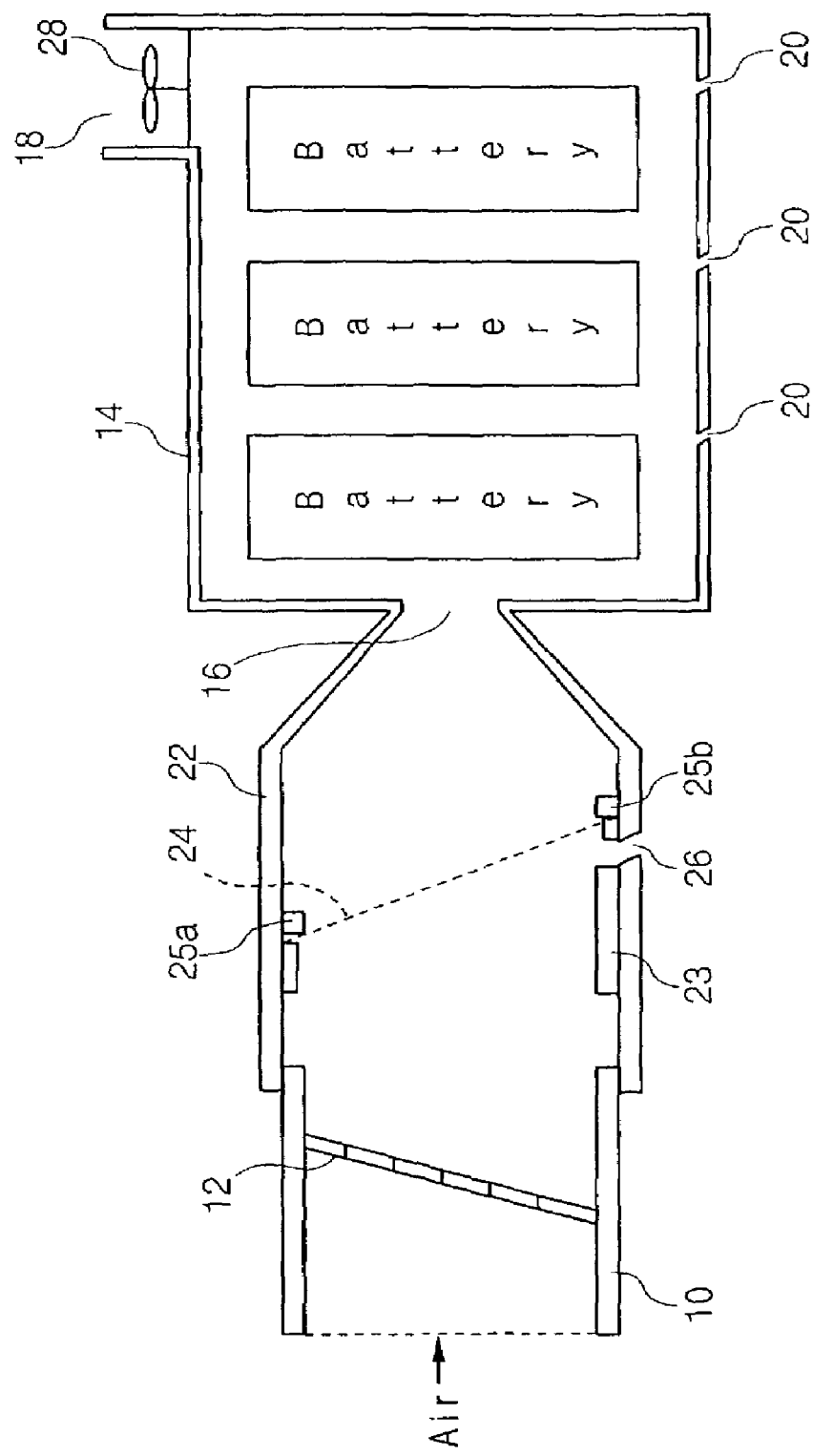
FIG. 1 is a schematic cross-sectional view of a cooling system for batteries in an electric vehicle according to a preferred embodiment of the present invention.

Preferred embodiments of the present invention will now be described in detail with reference to the accompanying drawings. Certain terminology will be used in the following description for convenience and reference only and will not be limiting. Words such as 'right', 'left', 'bottom', 'top', 'lower', 'upper', etc. will designate directions and locations in the drawings to which reference is made.

Figure 2:
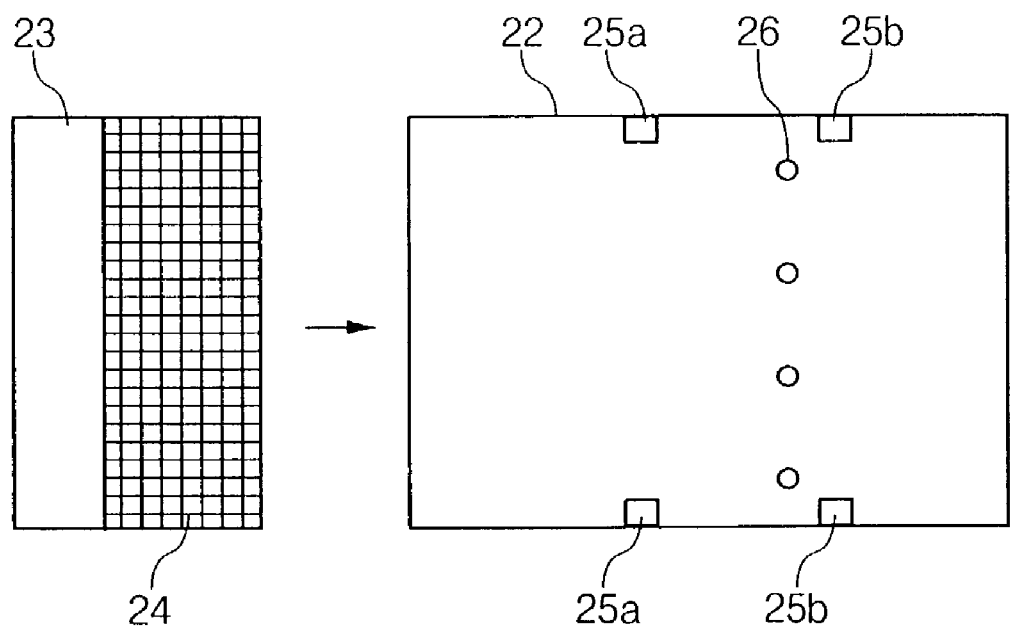
FIG. 2 is an exploded perspective view showing an internal structure of an air duct in the cooling system of FIG. 1.

As shown FIG. 2, the cooling system for batteries according to a preferred embodiment of the present invention includes an air conditioner 10 for generating cool air; a battery tray 14 in which batteries are mounted, the battery tray 14 having an air intake passageway 16 to receive the cool air supplied by the air conditioner 10 to cool the batteries, and having an air exhaust passageway 18; an air duct 22 interconnecting the air conditioner 10 and the air intake passageway 16 of the battery tray 14; and a cooling fan 28 provided in the air exhaust passageway 18 of the battery tray 14.

A mesh assembly 24 is fixedly provided within in the air duct 22. The mesh assembly 24 has a predetermined thickness and strength, and includes a plurality of holes formed therein. The mesh assembly 24 is provided in the air duct 22 such that air exiting the air conditioner 10 first passes through the mesh assembly 24 before entering the air intake passageway 16 of the battery tray 14. Preferably, the mesh assembly 24 is mounted in the air duct 22 at a leftward slant to enhance its filtering ability. That is, an evaporator 12 of the air conditioner 10 is mounted having a rightward slant such that an area of contact with the air flowing therethrough is maximized, thereby improving cooling efficiency. Using the same principle, therefore, it is preferable that the mesh assembly 24 is slanted in a direction opposite the evaporator 12 so that there occurs a maximum amount of filtering of the condensation contained in the cool air exiting the air conditioner 10.

Further, a plurality of first condensation drain holes 26 are formed in the air duct 22. The first condensation drain holes 26 are formed in a line directly to the left to where a lower end of the mesh assembly 24 contacts the air duct 22. Preferably, the first condensation holes 26 are about 8 mm in diameter. Also, it is preferable that a lower portion of the first condensation drain holes 26 is slanted at an angle in a rightward direction to prevent water or other substances from flowing back toward the air conditioner 10.

With reference also to FIG. 2, in order firmly secure the mesh assembly 24 in its position in the air duct 22, a mesh guide 23, preferably integrally formed with the mesh assembly 24, is held in position by upper and lower stoppers 25a and 25b formed in the air duct 22. To effect the leftward slant of the mesh 24 as described above, the lower stopper 25b is mounted more to the right than the upper stopper 25a. Further, passage holes (not shown) are formed at areas of the mesh guide 23 overlapping the first condensation drain holes 26 so that the inside of the air duct 22 communicates with the air outside the cooling system at the first condensation drain holes 26.

With the above configuration, when air that contains condensation passes through the mesh assembly 24, the condensation is caught in the mesh assembly 24 and flows downward. The condensation then accumulates in one area as a result of the mesh assembly 24 such that the resulting water droplets are sufficiently massive to pass through the first condensation drain holes 26. That is, the water droplets are big enough so that the gravitational pull acting thereon exceeds the negative pressure created by the operation of the cooling fan 28, thereby enabling the water droplets to exit through the first condensation drain holes 26.

Also, second condensation drain holes 20 are formed in a bottom of the battery tray 14. It is preferable that a diameter of the second condensation drain holes 20 is approximately 5 mm. If the diameter of the second condensation drain holes 20 exceeds 5 mm, the negative pressure acting on the second condensation drain holes 20 surpasses the negative pressure acting on the first condensation drain holes 26 by the operation of the cooling fan 28. This causes external air to enter the battery tray 14 through the second condensation drain holes 20, thereby decreasing the cooling effect of the system.

It is preferable that a wall portion of the second condensation drain holes 26 is slanted at a predetermined angle in a rightward direction to prevent water or other substances exiting the second condensation drain holes 26 from flowing back into the battery tray 14. Preferably, there is one second condensation drain hole 20 for each battery in the battery tray 14. Condensation that is not completely drained through the first condensation drain holes 26 accumulates in the battery tray 14. The second drain holes 20 allow the accumulated condensation to exit from the battery tray 14 when the vehicle is being driven. That is, when the vehicle is being driven, the flow of the air outside the battery tray 14 acts to draw the water out through the second condensation drain holes 20.

In the cooling system for batteries in an electric vehicle structured as described above, the air conditioner 10 operates during battery charging to generate cool air. By the operation of the cooling fan 28 positioned in the air exhaust passageway 18, the cool air passes through the air duct 22 then through the battery tray 14 to cool the batteries provided therein. The air warmed by this process is discharged through the air exhaust passageway 18. When the cool air passes through the air duct 22, the condensation contained in the cool air is caught in the mesh assembly 24 mounted in the air duct 22. The condensation then flows down to the bottom of the mesh assembly 24 where it collects to form water droplets. This process is continued until the water droplets become sufficiently massive so that the gravitational pull acting thereon exceeds the force of the negative pressure created by the operation of the cooling fan 28. At this point, the water exits the first condensation drain holes 26.

Also, although most of the condensation in the cool air exiting the air conditioner 10 is collected and drained through the combined operation of the mesh assembly 24 and the first condensation drain holes 26, part of the condensation nevertheless passes through the mesh assembly 24 and enters the battery tray 14. This condensation accumulates on the floor of the battery tray 14. However, when the vehicle is driven, the flow of the air outside the battery tray 14 acts to draw the water out through the second condensation drain holes 20.

With the effective removal of water from the cooling system of the present invention, the problems associated with water in the system such as battery corrosion are prevented.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A cooling system for batteries in an electric vehicle comprising:
   an air conditioner for generating cool air;
   a battery tray adapted to have batteries mounted therein, the battery tray having an air intake passageway to receive the cool air supplied by the air conditioner to cool the batteries, and having an air exhaust passageway;
   an air duct interconnecting the air conditioner and the air intake passageway of the battery tray;
   a mesh assembly including a plurality of holes being mounted within the air duct;
   first condensation drain holes formed along a lower end of the mesh assembly; and
   a cooling fan provided in the air exhaust passageway of the battery tray, the cooling fan drawing the air inside the battery tray outside the system.

2. The cooling system of claim 1, wherein the mesh assembly includes a mesh guide integrally formed to the mesh assembly, the mesh guide of the mesh assembly being secured within the air duct by stoppers formed inside the air duct.

3. The cooling system of claim 1, wherein the mesh assembly is mounted in the air duct in a state where an upper end of the mesh assembly is positioned closer to the air conditioner by a predetermined amount than a lower end of the mesh assembly, thereby resulting in a slanted configuration of the mesh assembly.

4. The cooling system of claim 1, wherein a lower portion of the first condensation drain holes is slanted at a predetermined angle in a direction away from the air conditioner.

5. The cooling system of claim 1, wherein second condensation drain holes are formed in a bottom portion of the battery tray.

6. The cooling system of claim 5, wherein a lower portion of the second condensation drain holes is slanted at a predetermined angle in a direction away from the air conditioner.

7. The cooling system of claim 5, wherein one of the second condensation drain holes is formed for each battery in the battery tray.

8. The cooling system of claim 5, wherein a diameter of the second condensation drain holes is smaller than a diameter of the first condensation drain holes.

* * * * *